(12) United States Patent
Finch

(10) Patent No.: US 10,351,194 B1
(45) Date of Patent: Jul. 16, 2019

(54) ILLUMINATED BICYCLE TIRE

(71) Applicant: Brightz, ltd., Ottawa Lake, MI (US)

(72) Inventor: Ronald Finch, Ottawa Lake, MI (US)

(73) Assignee: Brightz, ltd., Ottawa Lake, MI (US)

( * ) Notice: Subject to any disclaimer, the term of this patent is extended or adjusted under 35 U.S.C. 154(b) by 0 days.

(21) Appl. No.: 15/907,204

(22) Filed: Feb. 27, 2018

Related U.S. Application Data

(60) Provisional application No. 62/464,213, filed on Feb. 27, 2017.

(51) Int. Cl.
| | | |
|---|---|---|
| *B62J 6/00* | (2006.01) | |
| *B62J 6/20* | (2006.01) | |
| *B62J 6/18* | (2006.01) | |
| B62J 99/00 | (2009.01) | |
| B60B 1/00 | (2006.01) | |

(52) U.S. Cl.
CPC ............... *B62J 6/20* (2013.01); *B62J 6/001* (2013.01); *B62J 6/18* (2013.01); *B60B 1/003* (2013.01); *B60B 2900/571* (2013.01); *B62J 2099/004* (2013.01)

(58) Field of Classification Search
CPC ....... B62J 6/20; B62J 6/001; B62J 6/18; B62J 2099/004; B60B 1/003; B60B 2900/571
USPC .......................................................... 362/473
See application file for complete search history.

(56) References Cited

U.S. PATENT DOCUMENTS

| | | | | |
|---|---|---|---|---|
| 4,787,014 | A * | 11/1988 | Wodder | B62J 6/20 340/432 |
| 8,337,060 | B1 * | 12/2012 | Frankovich | B60Q 1/326 315/76 |
| 2012/0320614 | A1 * | 12/2012 | Malone | B60Q 1/326 362/500 |

* cited by examiner

*Primary Examiner* — Julie A Bannan
(74) *Attorney, Agent, or Firm* — Kegler, Brown, Hill & Ritter & Co. LPA; Lorraine Hernandez

(57) ABSTRACT

Disclosed is an illumination device for use with spoked tires, such as the common tires found on bicycles. The illumination device may comprise a power source which is removably attached to the hub portion by a holder, said holder comprising a strap portion, a hook portion, a handle portion, and a pocket portion; where the strap portion is wrapped around a circumference of the hub portion, and there are a plurality of wires extending from the power source where the wires contain a plurality of light sources.

7 Claims, 11 Drawing Sheets

ILLUMINATED BICYCLE TIRE

This application claims the benefit of U.S. Provisional Application No. 62/464,213, filed on Feb. 27, 2017, which is hereby incorporated by reference in its entirety.

BACKGROUND

Bicycle tires with integrally formed illumination sources are known in the art. However, these bicycle tires require replacing pre-existing tires, or purchasing a bicycle with the tires already in place. These products increase costs to the consumer significantly, especially a consumer who already owns a bicycle or vehicle with similarly styled wheels.

Other apparatuses that illuminate a bicycle tire are large and cumbersome, with non-flexible parts and large power sources. For example, many apparatuses attempt to attach a power source directly to the spokes of the bicycle wheel. This solution is undesirable, as it significantly offsets the center of the mass of the tire, and introduces centripetal forces onto the device. In order to brace against these forces, the mass of the device must be increased, further offsetting the center of mass.

Thus, there is a need in the art for a device which can illuminate a bicycle tire without the drawbacks of the prior art.

SUMMARY

Presently disclosed is an illuminated bicycle wheel, where a wire is extending from a power source attached to a central hub of the wheel along a spoke. The wire contains a plurality of light sources, and the wire is attached to the spoke by a cable tie. The power source for the illumination sources is placed around the central hub of the tire, and secured in place. In some embodiments, the power source is secured in place by a holder comprising a flexible rubber-like material.

DETAILED DESCRIPTION OF THE FIGURES

Figure 1:
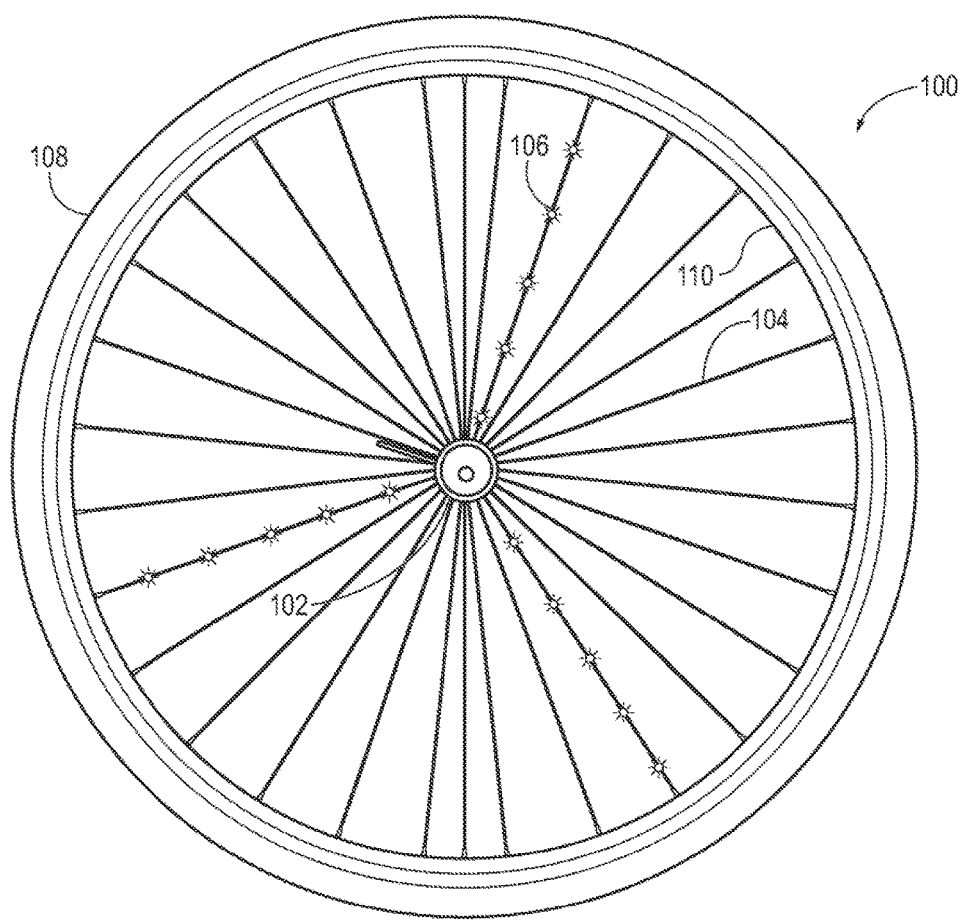
FIG. 1 illustrates a side view of an illuminated bicycle wheel.

FIG. 1 illustrates a side view of an illuminated bicycle wheel 100. A hub portion 102 is locate in the center of a wheel, the wheel having multiple spokes 104. One end of each spoke 104 connects to the hub portion 102, while the other end of each spoke connects to the rim portion 110. The rim portion 110 provides structure for the tire portion 108. Connected to the hub portion 102, which may be centrally located, is an illumination device. The illumination device powers a plurality of light sources 106. In some aspects of the invention, the plurality of light sources 106 are connected to a wire and wound around the spokes 104. The wires may travel a predetermined length up the spoke, as measured from the start of the spoke and central hub, such as 75% the total length of the spoke.

Figure 2:
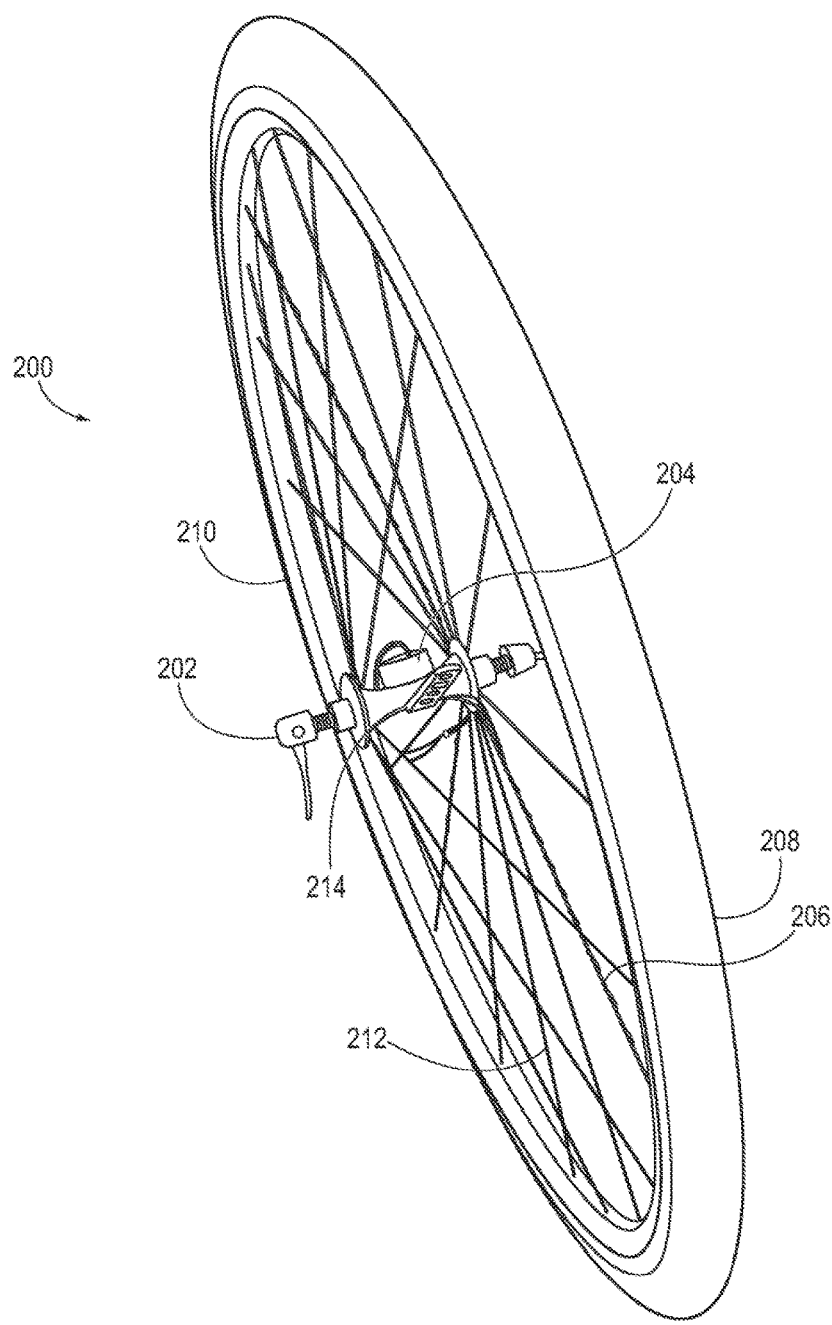
FIG. 2 illustrates an isometric skewed perspective view of an illuminated bicycle wheel.

FIG. 2 illustrates an isometric skewed perspective view of an illuminated bicycle wheel 200. A central hub portion 202 is connected to a plurality of spokes 212. The spokes 212 are connected to a rim 210 which provides structure for a tire 208. A power source is located in a holder 204, the holder including a strap portion 214. Broadly stated, wires 206 extend out from the power source and may wind around the spokes 212, enabling the placement of a plurality of light sources. In some aspects of the invention, the plurality of light sources are Light Emitting Diodes (LED).

Figure 3:
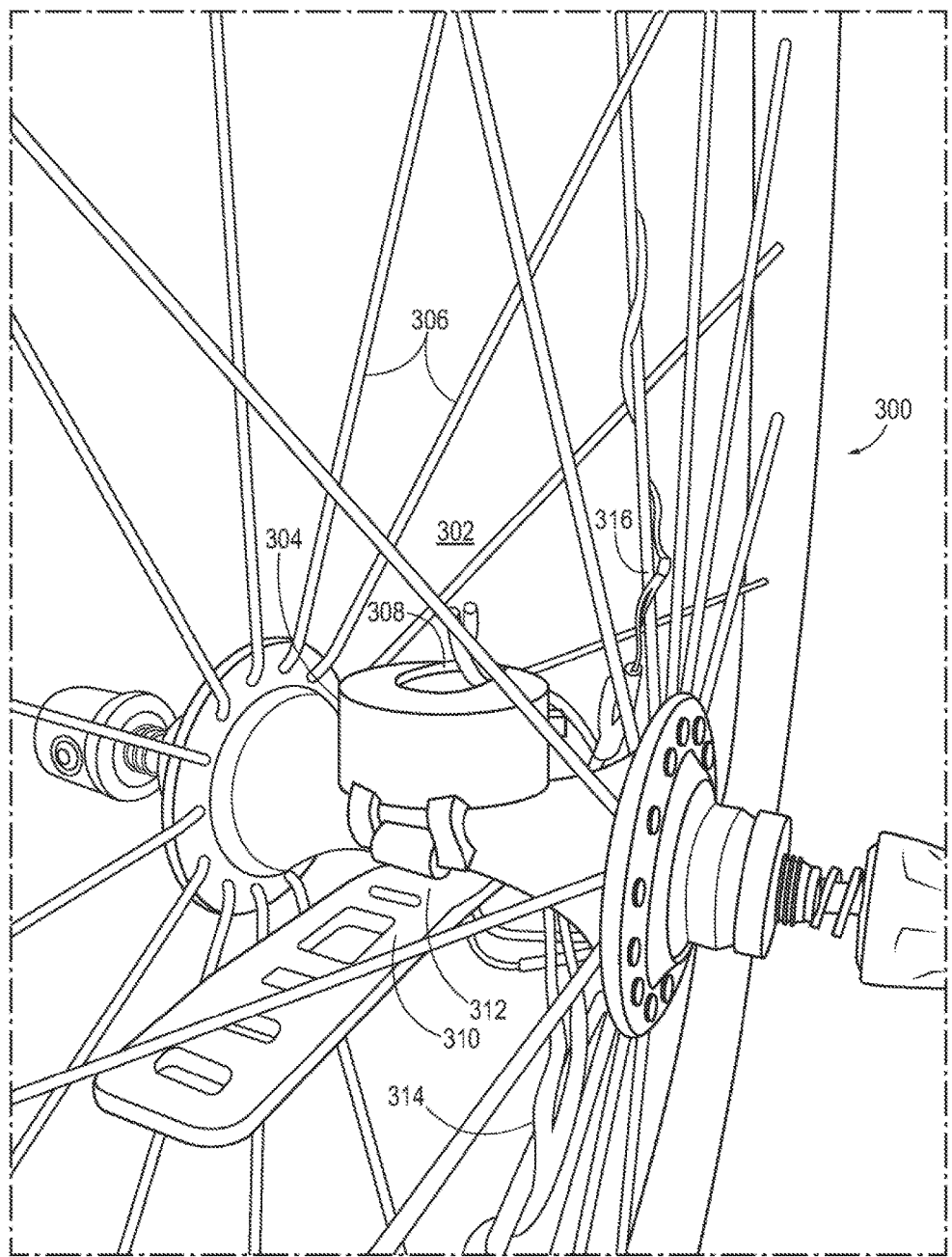
FIG. 3 illustrates a close-up view of an illuminated bicycle wheel.

FIG. 3 illustrates a close-up view of an illuminated bicycle wheel 300. A holder 304 is wrapped around a central portion of a hub portion of the tire. The holder 304 includes a pocket portion 302, a hook portion 312, a strap portion 310, and a handle portion 313. A power source 308 is located within the pocket portion 302 and at least two wires 314 extending out from the pocket portion 304, each wire containing a plurality of light sources 316.

In one aspect of the invention, the tire as a whole is already existing and the illumination device is installed on the tire, which in an exemplary embodiment is a bicycle tire. The strap portion 310 is wrapped around the central hub portion and is linked into the hook portion 312. The hook portion 312 is connected to the pocket portion 302 by the handle portion 313. The wires which extend from an embedded power source are then wrapped around the spoke of the tire. They may be secured in place, such as by a cable tie.

The illumination device may stay secured to the central hub due to a choice of material which has a high coefficient of friction, such as a rubber like material. The strap portion 310 in some aspects may contain more than one hoke portion capable of accepting the hook portion 312. The material may also be elastic, such that the strap portion 310 can be stretched beyond its resting length to link into the hook portion. By stretching the strap portion, a normal pressure can be exerted by the device onto the central hub, increasing friction and securing the device to the tire.

The pocket portion 304 may comprise an opening to permit the installation of a power source into the holder. The holder may be capable of deforming in order to allow the power source to enter the pocket portion and be secured.

In another aspect of the invention, the holder may be a single integrated piece formed of the pocket portion, handle, nub, and strap portion. In this aspect, the integrated holder would be formed of a single material, such as a rubberized material capable of deformation and having an elasticity modulus which is low, such as 2.0 GPa, 1.0 GPa, or less than 0.1 GPa.

The plurality of light sources may also include LEDs which emit light of varying wave lengths, and those wavelengths may change over time.

Figure 4:
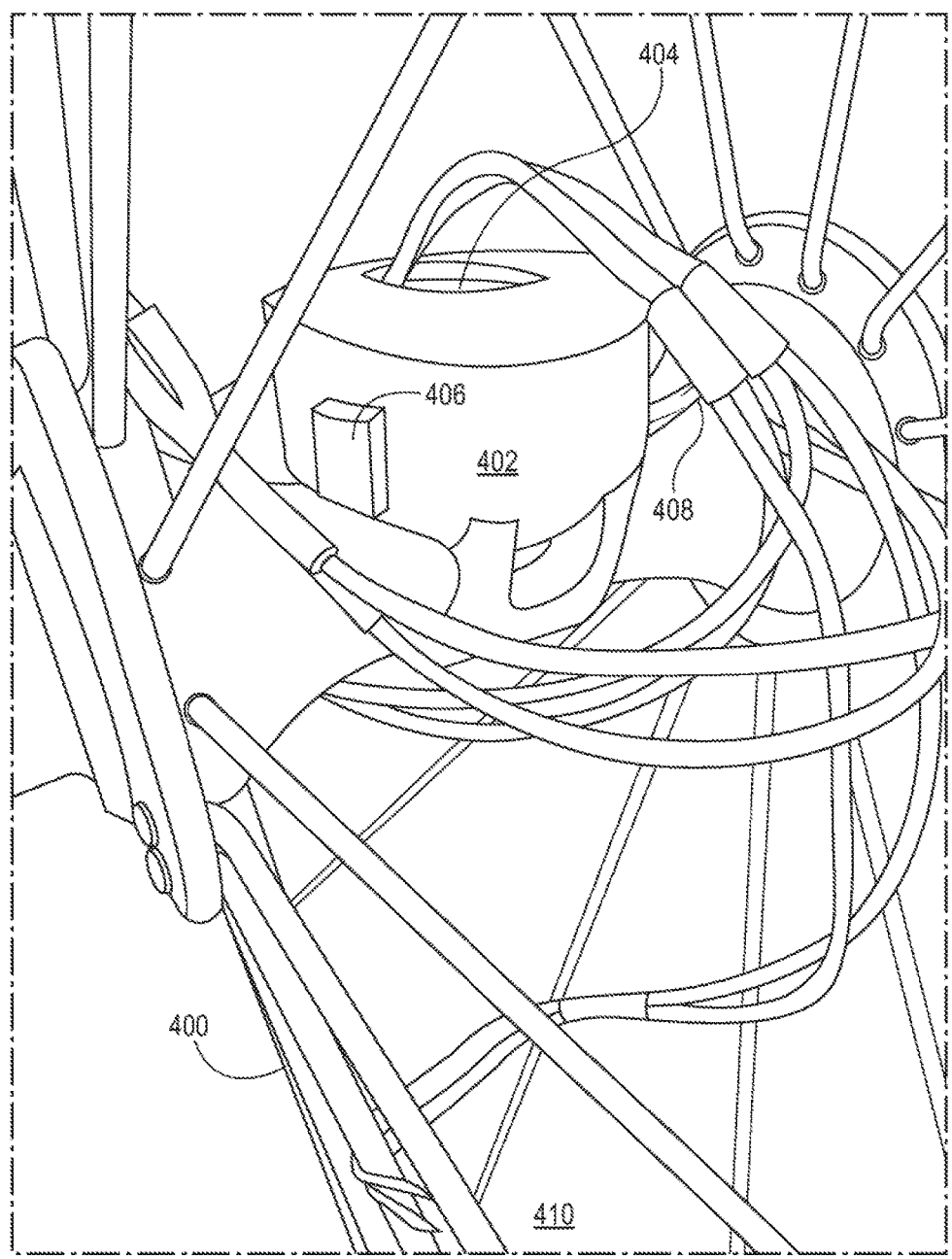
FIG. 4 illustrates a close-up view of an illuminated bicycle wheel.

FIG. 4 illustrates another close-up view of an illuminated bicycle wheel 400. A pocket portion 402 may also include a nub 406 which enables a user to quickly identify the location of a power switch attached to the power source 404. Wires 408 extend from the power source 404, where in one aspect the wires may split at 410 to create positive and negative leads.

Figure 5:
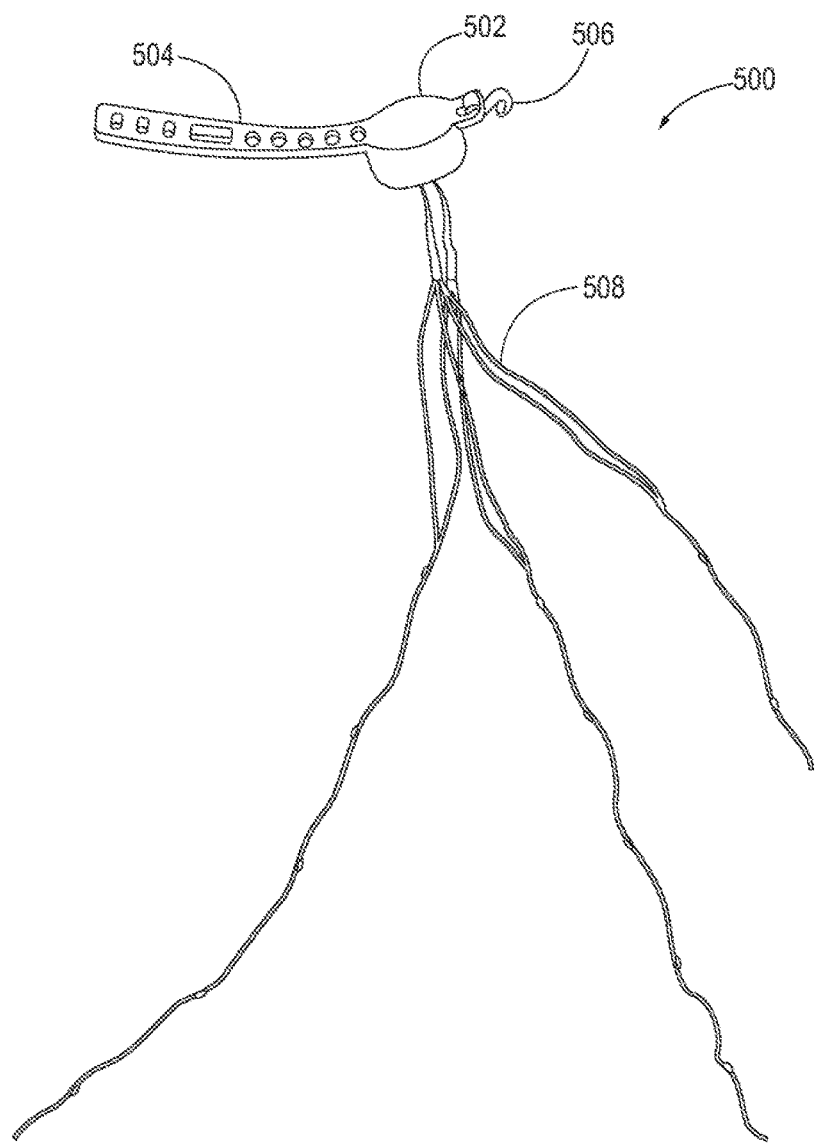
FIG. 5 illustrates a side view of an illumination device.

FIG. 5 illustrates a side view of an illumination device 500. A strap portion 504 is attached to a pocket portion 502, which is attached to a hook portion 506 by way of a handle portion. A plurality of wires 508 extend from a power source located in the pocket portion, each wire containing a plurality of light sources.

By way of non-limiting example, FIG. 5 illustrates an illumination device containing 3 primary positive and negative leads, and 6 secondary leads. This is done because the output of the power source is a single negative lead and a single positive lead. Those two wires may then split, such that a proper circuit is formed for each lead containing a plurality of illumination sources. Done this way, the manufacturing cost for the power source can be reduced as less contacts on a terminal are necessary.

Figure 6:
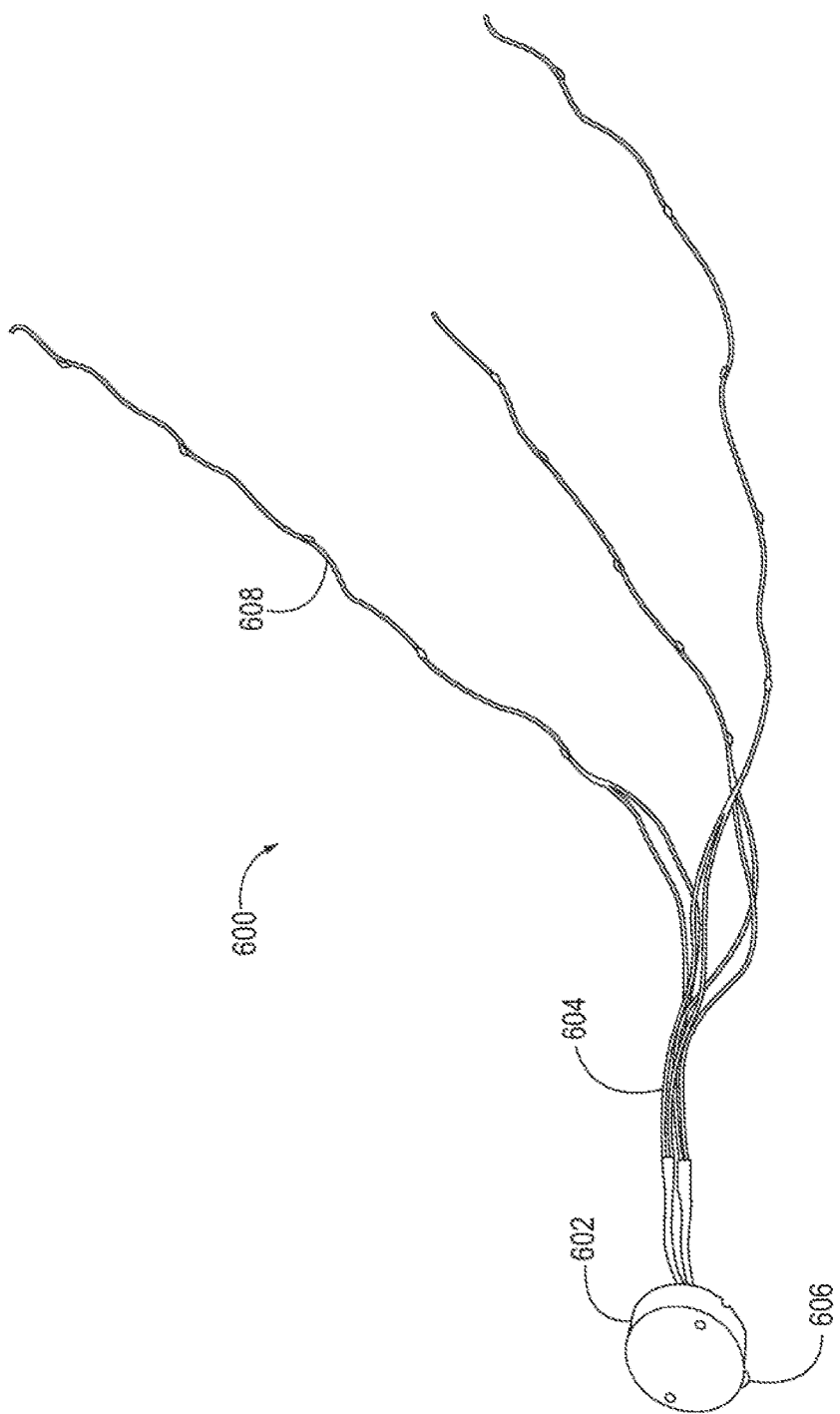
FIG. 6 illustrates a side view of a portion of an illumination device.

FIG. 6 illustrates a side view of a portion of an illumination device 600, wherein the power source 602 is located outside of a holder. The power source 602 contains a power switch 606, and a plurality of wires extend out from the power source. Each wire contains a plurality of light sources 608.

Figure 7:
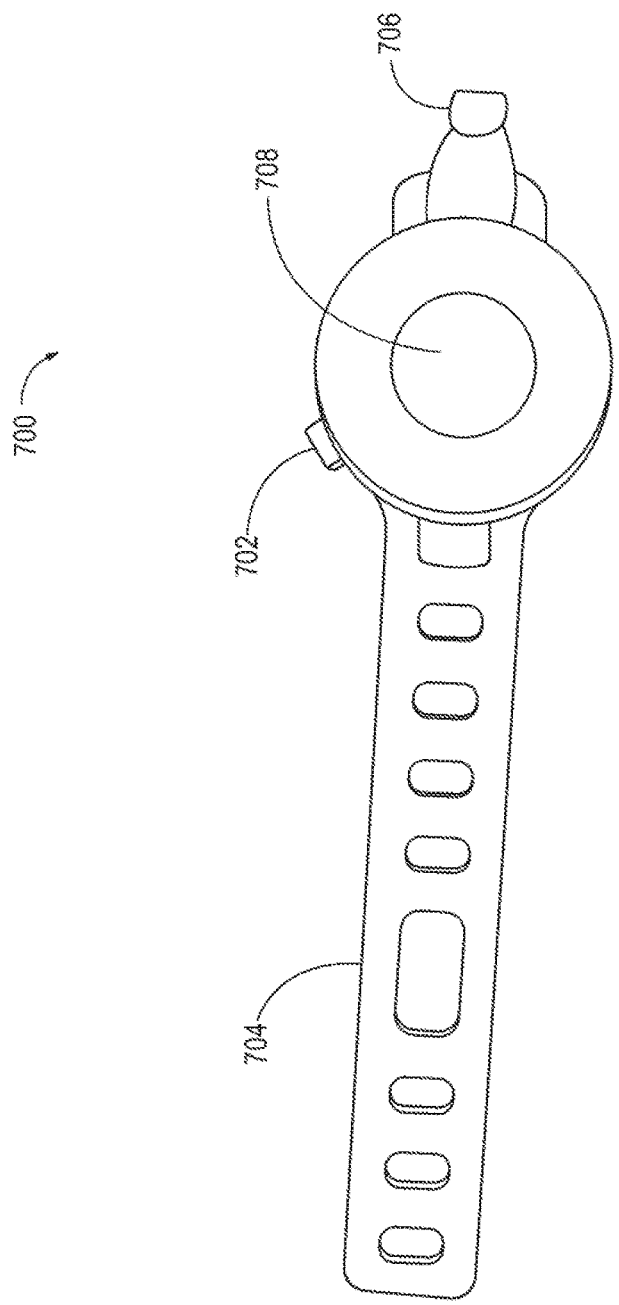
FIG. 7 illustrates a portion of an illumination device

FIG. 7 illustrates a portion of an illumination device 700, wherein the power source has been removed from a holder. A nub 702 is connected to a pocket portion 708, the pocket portion 708 being connected to a hook portion 706 by a handle portion. A strap portion 704 is connected to the pocket portion 708 on the opposite side of the hook and handle portion.

Figure 8:
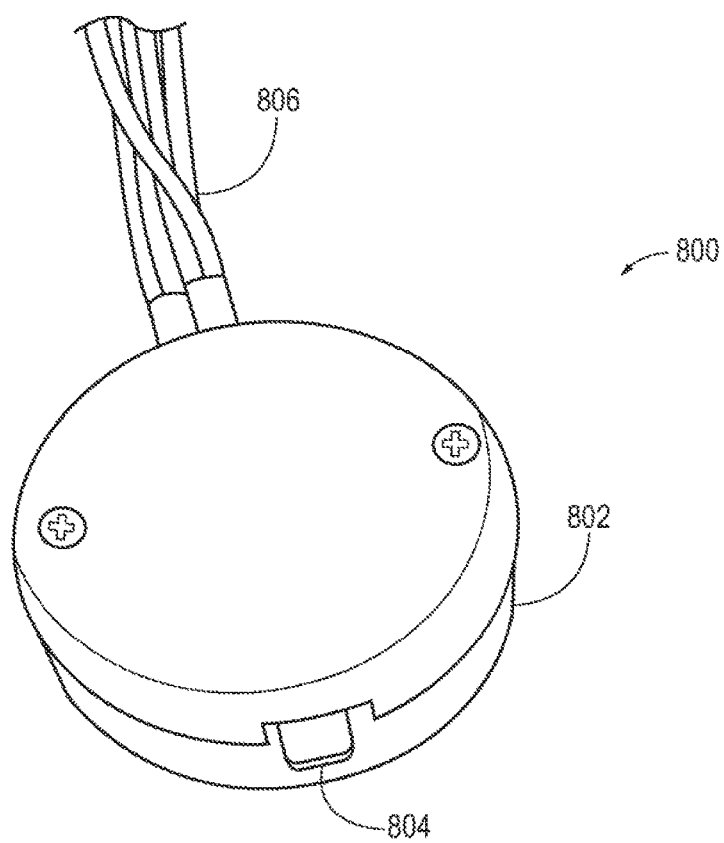
FIG. 8 illustrates a portion of an illumination device

FIG. 8 illustrates a portion of an illumination device 800. A power source 802 also contains a power switch 804, where a plurality of wires 806 extend out from the power source.

Figure 9:
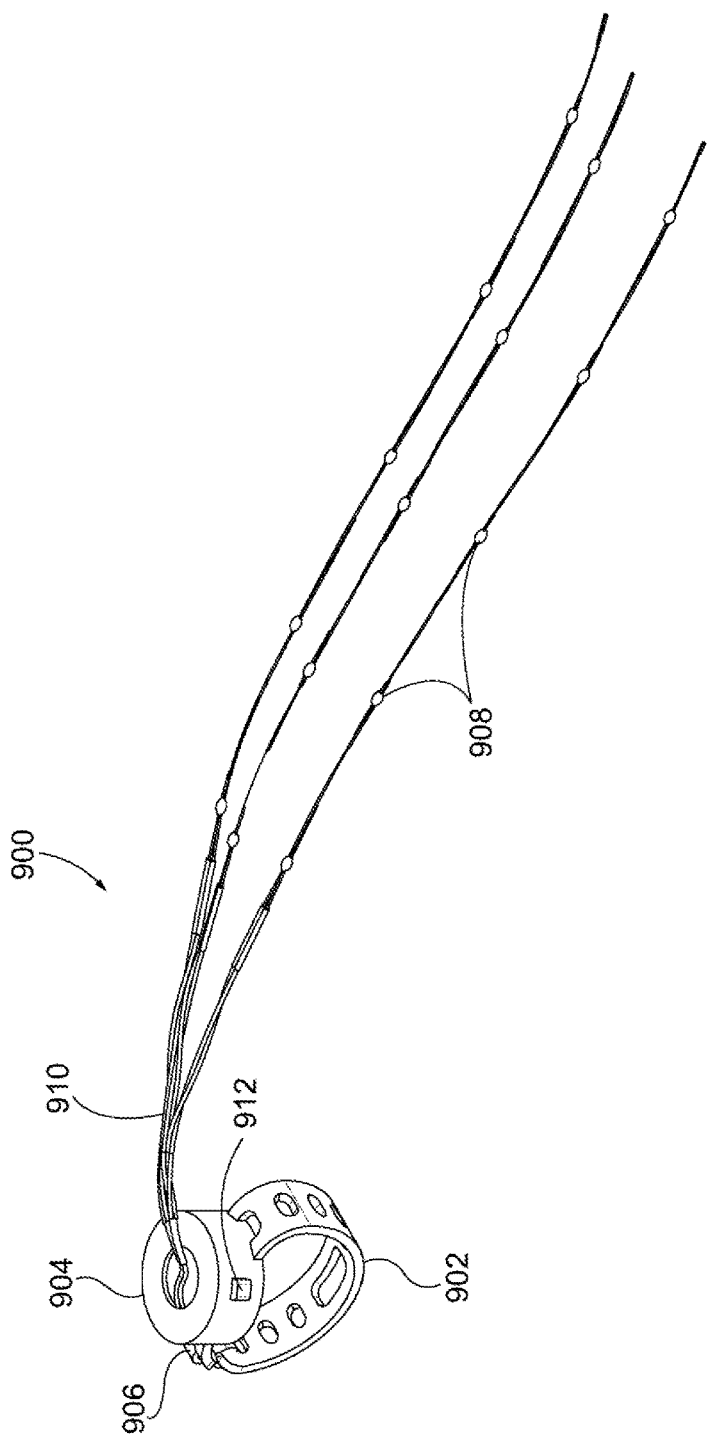
FIG. 9 illustrates an isometric view of an illumination device

FIG. 9 illustrates an isometric view of an illumination device 900. A strap portion 902 is attached to a pocket portion 904, which is attached to a hook portion 906 and the pocket portion 904 containing a nub portion 912. A power source located within the pocket portion 904 contains multiple wires 910 extending out from the holder, each wire containing a plurality of light sources 908.

Figure 10:
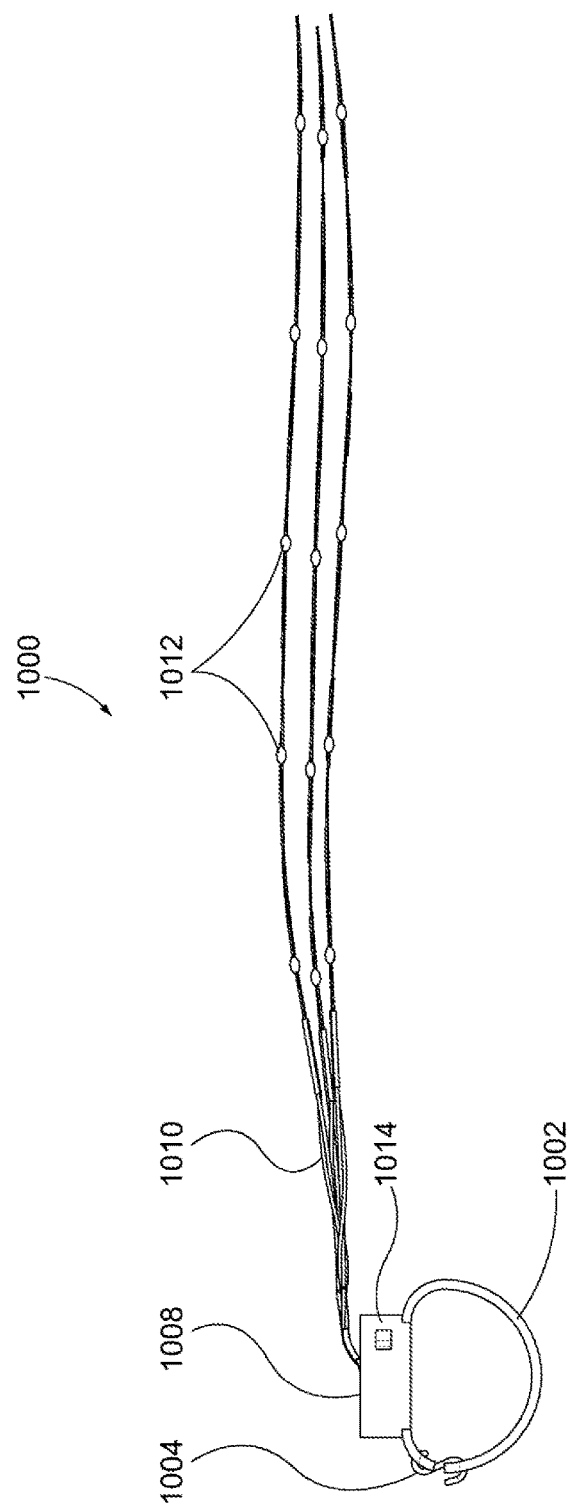
FIG. 10 illustrates a side view of an illumination device.

FIG. 10 illustrates a side view of an illumination device 1000. A strap portion 1002 is looped into a hook portion and handle portion 1004, the handle portion being attached to the pocket portion 1008 which contains a nub portion 1014. A power source contains a plurality of wires 1010 which extend outward and contain a plurality of light sources 1012.

Figure 11:
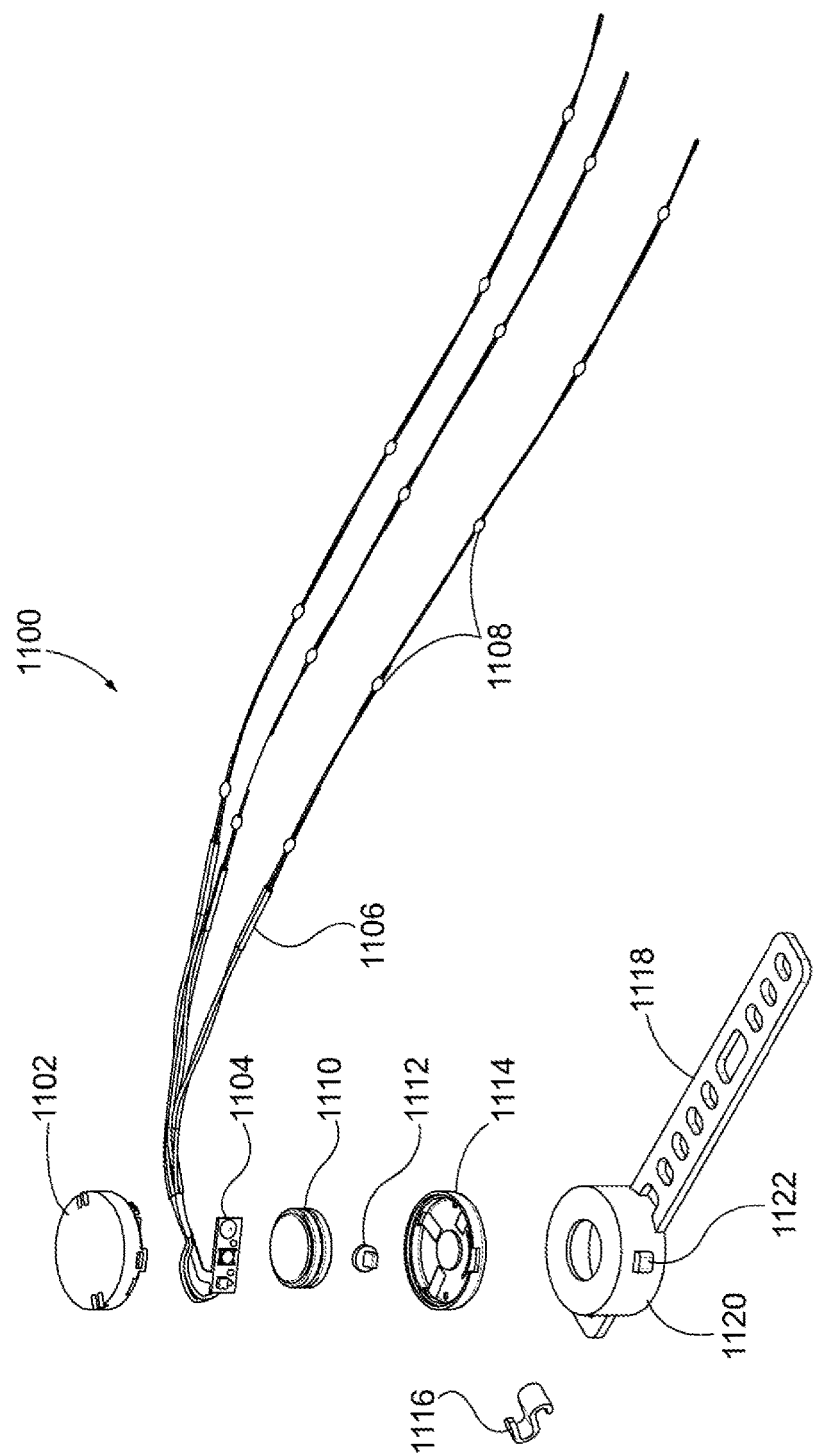
FIG. 11 illustrates an exploded view of an illumination device.

FIG. 11 illustrates an exploded view of an illumination device 1100. A top portion 1102 and bottom portion 1114 contain an extension portion 1112 which abuts a power switch 1104, wherein actuation of the switch toggles current flow of electrical power from a battery 110 through a plurality of wires 1106, powering a plurality of light sources 1108. A pocket portion 1120 is connected to a strap portion 1118 and a nub portion 1122, and may be connected to a hook portion 1116 via a handle portion located on the pocket portion.

What is claimed is:

1. A method for illuminating a vehicular tire, the method comprising the steps:
    a. placing a power source into a pocket portion of a holder, forming an illumination device, said power source containing a plurality of wires extending from the power source, where the pocket portion is attached to a handle and a strap;
    b. affixing the illumination device onto a central hub of a vehicular tire, by wrapping the strap at least partially around a circumference of the central hub, the strap including a hook which is attached to the handle; and
    c. extending at least one wire from the plurality of wires along a spoke from a plurality of spokes, and attaching a portion of the at least one wire to the spoke by wrapping the at least one wire and spoke together with a cable tie.

2. The method for illuminating a vehicular tire as claimed in claim 1, where the holder is made of rubber.

3. The method for illuminating a vehicular tire as claimed in claim 1, where the strap contains at least two holes capable of accepting and attaching to the hook.

4. The method of illuminating a vehicular tire as claimed in claim 1, where the pocket portion includes a marking corresponding to a location of a power switch located on the power source.

5. The method of illuminating a vehicular tire as claimed in claim 1, where each wire from the plurality of wires includes a plurality of light sources.

6. The method of illuminating a vehicular tire as claimed in claim 5, including the additional step of depressing a button located on the power source, causing electricity to flow to the plurality of light sources.

7. The method of illuminating a vehicular tire as claimed in claim 5, where the plurality of light sources output a different frequency of light for each wire of the plurality of wires.

* * * * *